(12) United States Patent
Micke et al.

(10) Patent No.: US 8,361,317 B2
(45) Date of Patent: Jan. 29, 2013

(54) FILTER DEVICE FOR A MOTOR VEHICLE

(75) Inventors: Michael Micke, Stuttgart (DE); Guenter Jokschas, Murrhardt (DE); Martin Weindorf, Kornwestheim (DE); Dieter Schreckenberger, Marbach (DE); Elke Duerr, Asperg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 332 days.

(21) Appl. No.: 12/719,403

(22) Filed: Mar. 8, 2010

(65) Prior Publication Data

US 2010/0224549 A1 Sep. 9, 2010

(30) Foreign Application Priority Data

Mar. 6, 2009 (DE) .......................... 10 2009 011 568

(51) Int. Cl.
*B01D 69/04* (2006.01)
*B01D 69/10* (2006.01)

(52) U.S. Cl. ................ 210/321.6; 210/232; 210/321.79; 210/321.8; 210/321.88; 210/321.89; 210/348; 210/441; 210/483; 210/488; 210/489; 210/490

(58) Field of Classification Search .................. 210/232, 210/321.6, 321.65, 321.78, 321.79, 321.8, 210/321.87, 321.88, 321.89, 348, 441, 445, 210/459, 483, 486, 488, 489, 490, 497.01

See application file for complete search history.

(56) References Cited

U.S. PATENT DOCUMENTS

| | | | |
|---|---|---|---|
| 5,139,741 A | | 8/1992 | Hagiwara |
| 5,259,953 A | * | 11/1993 | Baracchi et al. ............... 210/232 |
| 5,916,440 A | * | 6/1999 | Garcera et al. ................ 210/232 |
| 5,919,362 A | * | 7/1999 | Barnes et al. ................. 210/232 |
| 2003/0209482 A1 | | 11/2003 | Klotz et al. |
| 2005/0077230 A1 | | 4/2005 | Jokschas et al. |
| 2005/0161394 A1 | | 7/2005 | Fritze |

FOREIGN PATENT DOCUMENTS

| | | |
|---|---|---|
| DE | 19731551 | 1/1991 |
| DE | 19731551 | 1/1999 |
| DE | 10222102 | 11/2003 |
| EP | 0270051 | 6/1988 |
| JP | 61197013 | 12/1986 |
| WO | WO2009017478 | 2/2009 |

OTHER PUBLICATIONS

German Patent Office Office Action in DE 10 2009 011 568.4, (Dec. 15, 2009).
EP search report for EP 10 15 5761, (May 2010).

* cited by examiner

*Primary Examiner* — John Kim
(74) *Attorney, Agent, or Firm* — James Hasselbeck (57) ABSTRACT

A filter device for a motor vehicle has a filter element with a porous ceramic support body provided with one or more passages for receiving a liquid to be filtered and filter membranes formed on inner walls of the passages. The liquid to be filtered passes through the filter membranes into the support body and exits from the support body through a circumferential surface of the support body. At least one compensation element is arranged at an end face of the support body. The compensation element is elastically deformable for providing an additional liquid volume that is generated when the liquid expands due to freezing.

16 Claims, 6 Drawing Sheets

FILTER DEVICE FOR A MOTOR VEHICLE

CROSS REFERENCE TO RELATED APPLICATIONS

This application claims the benefit under 35 USC 119 of foreign application DE 10 2009 011 568.4 filed in Germany on Mar. 6, 2009, and which is hereby incorporated by reference in its entirety.

TECHNICAL FIELD

The invention relates to a filter device for cleaning liquids in a motor vehicle, for example, separated diesel water of fuel filters.

BACKGROUND OF THE INVENTION

The present inventive disclosure concerns a filter device for cleaning liquids in a motor vehicle, for example, separated diesel water of fuel filters including a porous ceramic support body.

A prior art filter device of this type is disclosed in DE 197 31 551 A1. The employed ceramic structures of the support body have a high strength but are comparatively brittle, i.e., inelastic. The ceramic filter membranes are porous structures with a high open pore volume (in general >30% open porosity). When water penetrates into these pores and freezes a partially very high stress is produced as a result of the volume expansion of water (up to 10%) which may cause destruction of the brittle ceramic. In order to prevent this or in order to relieve the ceramic structure, it is beneficial to reduce the dead volume in a way that the filter membrane is flowed through from the interior to the exterior because in this way the freezing water can expand through the membrane pores into an outwardly open environment. This configuration contributes significantly to improved freeze resistance. Such a measure alone is however not sufficient in order to ensure freeze-safe operation of the filter device.

SUMMARY OF THE INVENTION

The invention concerns a filter device for cleaning liquids in a motor vehicle, for example, separated diesel water of fuel filters, including at least one filter element with a porous ceramic support body in which one or several passages for receiving liquid to be filtered are provided, as well as filter membranes formed at the inner wall of the passages through which a filtrate of the liquid can pass into the support member and exit at a circumferential surface of the support body.

It is an object of the present invention to provide a filter device of the aforementioned kind configured such that it can be used under freezing conditions for the filtration of a liquid that contains water.

In accordance with the present invention, this is achieved by a filter device of the aforementioned kind in which at least one elastic deformable compensation element is provided at an end of the support body in order to receive an additional liquid volume that is produced by the liquid as it expands upon freezing.

According to the invention, it is proposed to provide at least one compensation element at the end, i.e. below or above the passages, of the support body for receiving the liquid volume of the liquid which may generally have a high water content as it expands in the passages. The compensation element must be deformable in response to the ice-induced pressure generated during freezing and may be comprised, for example, of a closed-pore plastic foam, for example, of materials such as EPDM rubber (ethylene propylene diene monomer), VMQ (silicone rubber), PUR (polyurethane) etc. Alternatively, it is also possible to employ compressible mechanical components (for example, with inwardly positioned springs or the like) which are capable of compensating the additionally generated water volume caused by freezing.

Preferably, the compensation element has an elastically deformable membrane that seals the ends of the passages. The membrane seals the passages at their bottom side and, upon freezing of the liquid, the membrane is curved outwardly by the induced pressure of ice formation.

In an advantageous embodiment, the filter device has a housing for receiving the filter element in which a recess for receiving the membrane in the deformed state is provided. The recess can have, for example, a concavity whose dimension is selected such that the membrane at its maximum allowable elastic deformation completely fills the recess so that the membrane is prevented from further deformation which would possibly destroy the membrane.

Preferably, the compensation element is cap-shaped and has a securing element for securing it onto the circumferential surface of the support body or the circumferential surface of a sealing cap that encloses the end of the support body. The securing element can be, for example, in the form of a locking nose that is provided for engagement in a groove on the circumferential surface of the support body.

Particularly preferred, the securing element is a sealing element, in particular, an O-ring, for sealing the circumferential surface of the support body relative to a housing in which the filter element is arranged. An elastic securing element, for example, an O-ring can serve, in addition to its function as a securing element, also as a sealing element for sealing the clean side, formed at the circumferential surface of the support body, relative to a housing in which the filter element is arranged.

In an advantageous embodiment, at least one sealing cap surrounding the end of the support body includes a locking element for locking on a housing of the filter element or on a further sealing cap surrounding the opposite end of the support body. The sealing cap or caps, on the one hand, serve for sealing the clean side formed along the circumferential surface of the support element relative to the housing and, on the other hand, may serve for fixation of the filter element in the housing in that the locking element, for example, a locking nose, is locked into a counter member on the housing. The fixation of the filter element, additionally or alternatively, can be realized also in that one or both sealing caps have a geometry that is matched to the housing shape. Two sealing caps that are mutually locked with one another are particularly advantageous when the filter device has several spaced apart filter elements that are secured relative to one another in their relative position by means of the locked sealing caps. It is understood that the two sealing caps are not required to be directly locked with one another; instead, the two sealing caps can also be locked on a common locking element that surrounds the circumferential surface of the support body.

Preferably two or several spaced apart filter elements with support bodies, preferably with a circular or honeycomb-shaped geometry or cross-section, are arranged in a common housing. Advantageously, external geometries for the support bodies are used that have a uniform distribution of wall thickness or a volume proportion of the ceramic structure configured to be as minimal as possible in comparison to the surface area. In this connection, it is beneficial when an unhindered exit as much as possible is ensured for each passage. In this context, the arrangement of several filter elements forming smaller units in a common housing is especially preferred because the water can exit at the same time at all circumferential surfaces when freezing occurs and no unnecessary or negatively acting intermediate surfaces are present. The inner geometry of the individual support bodies, i.e., the arrangement of the passages within the support body, can be realized in different ways and embodied, for example, in the way described in CA 2192107, in CA 2192109, or DE 197 31 551 A1.

In a further embodiment, the support body is formed of a material with high-strength and high hardness. In order for the forces that are present during pore closure (last phase of the freezing process) to be safely compensated, high-strength ceramic materials of high purity (minimum 99%) and hardness are required. For example, suitable materials with high hardness or strength are aluminum oxide, silicon carbide, titanium dioxide, mullite or zirconium oxide.

The support body can comprise oxidic and/or non-oxidic ceramics. The support body particularly comprises ceramics with aluminum oxide, titanium oxide and/or zirconium oxide or silicon carbide. In particular the support body can consist substantially, i.e. more than 95%, of aluminum oxide. The support body may consist substantially of more than 95% of zirconium oxide or titanium oxide.

In case of 4-point bending strength tests, support bodies, in the form of ceramic multi-channel elements with 25 mm diameter and 19 traversing holes formed as channels with 3.5 mm diameter, should reach preferably a strength of more than 50 MPa, preferably more than 80 MPa, in order to improve frost-resistance accordingly.

The support body can comprise a macropore ceramic base body, where macropore refers to relative larger or course pores). This base body can be extruded. The base body can comprise holes, which traverse through the base body. A membrane can be superimposed on the surfaces of the base body, particularly on surfaces of the base body, which are provided by the holes. Preferably the membrane may comprise the same materials as the base body. Alternatively different ceramics for the membrane and the base body are possible. The membrane can be superimposed on the base body as ceramic coating with smaller pores, e.g. 1 nm to 10 nm, preferably 3 nm to 8 nm. The coating can be superimposed by a sol-gel coating process.

In particular, membranes can also comprise several coating layers. E.g. intermediate layers and separating layers can be used. In particular the same membrane materials may used as in the support body, only with a much finer granulation. The membranes are built in different layers with a particle size gradient. Thus the final membrane layer can be superimposed as fine as possible, because the efficiency would be notably lower with thicker separating layers. The porosities of such intermediate layers are preferably between 35 and 50%. The separating layer can be of the same materials as the support body. However aluminum oxide normally cannot be used in the alpha-phase (corundum), because these particles in nanometer scale (so called "nanoscaled particles") are not available. Therefore, aluminum oxide is used in the gamma-phase, which is available finely granulated (up to <10 nm particle size).

Surfaces of the base body in which purified water will not be drained as well as base body surfaces which are not entered by the diesel-water mixture, for example at a surface without a cermic membrane, these surfaces can be furnished with "sealings", such as sealing layer(s) or material(s). Sealings may comprise, for example, epoxy resin and/or polyurethane, particularly in layers of the materials. Sealings can also be created by suction or vacuum deposition of extremely fine particles, e.g. of PTFE, and closing the pores with particles.

Preferably an antifreeze agent is introduced into the passages of the filter element. In order to prevent an occurrence in which the water in the entire filter element (i.e., in the volume of the support body and in the passage volume) freezes simultaneously, it is necessary to precautions that the freezing points in the intake area, i.e., in the passages, and in the pores of the support body that are filled with pure water differ from one another. The differing freezing points can be achieved by introducing an antifreeze agent when producing the support body.

In an advantageous embodiment, an outlet or drain for the filtrate of the liquid is provided on a housing that surrounds the filter element and is arranged immediately above a sealing element for sealing the clean side of the filter element that is formed between the circumferential surface of the support body and the housing. In order to prevent the generation of ice-induced (freezing) pressure within the volume (clean side or permeate chamber) between exterior side or circumferential surface of the support body and the housing wall, the drain action of pure water must be realized at the lowest point of the housing. In this way, always a complete drainage of water from the housing is ensured. In addition to avoiding the pressure between the circumferential surface of the support body and the housing wall, it is also possible that upon freezing unhindered exit of water at the clean side is ensured.

In a further advantageous embodiment, the filter device comprises a discharge device, in particular a valve, for discharging the liquid to be filtered from the passages. A further option for improving the frost (or freeze) resistance is the defined emptying of the passages formed in the support body after shutting off the engine of the motor vehicle by means of a control device for controlling the discharge device, for example, for opening a valve that is arranged at the bottom side of the support structure. By emptying the passages, the water that is stored within the membrane pores of the filter membrane can penetrate into the passages and no ice-induced pressure acting on the surrounding ceramic structure of the support body can be generated in the passages.

In a preferred embodiment, the filter device additionally includes a cooling device, in particular a Peltier element, for freezing the filter membranes. The inventors have noticed that after freezing of the filter membrane or membranes the flow performance has significantly improved in case of the filtration of certain media (for example, filtration of hydrocarbon emulsions). Depending upon the state of the filter membrane (new or used), the flow performance, in comparison to the last value before freezing, can be increased by 10% to 300%. This can be explained inter alia in that the water that is contained in the cover layer and in the membrane pores will expand upon freezing and cause the cover layer to become detached. In order to deliberately cause a flow increase effect, it is possible to provide the housing of the filter element with a cooling device. A suitable cooling device, preferably a so-called Peltier element (thermoelectric cooling), can be preferably utilized as it requires no additional compression or chemical additives. Alternatively, also a so-called adsorber cooling or a compressor cooling as they are generally known in engineering can be used. In this way, a significant extension of the operational life of the filter membrane is possible because the deposited substances, at least partially, will become detached upon freezing and the flow performance of the filter membrane can be increased. In order to increase the efficiency of the cooling action, a suitable insulation can be provided on the housing.

It is understood that some of the aforementioned measures for frost-safe (freeze-safe) operation of the filter device do not necessarily require the use of ice compensation elements so that these measures represent aspects of the invention that may also constitute in themselves, i.e., without combination with an ice compensation element, an inventive concept. For example, particularly when providing a discharge device on the filter element, an ice compensation element may optionally be dispensed with.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter device for cleaning liquids in a motor vehicle. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1A:
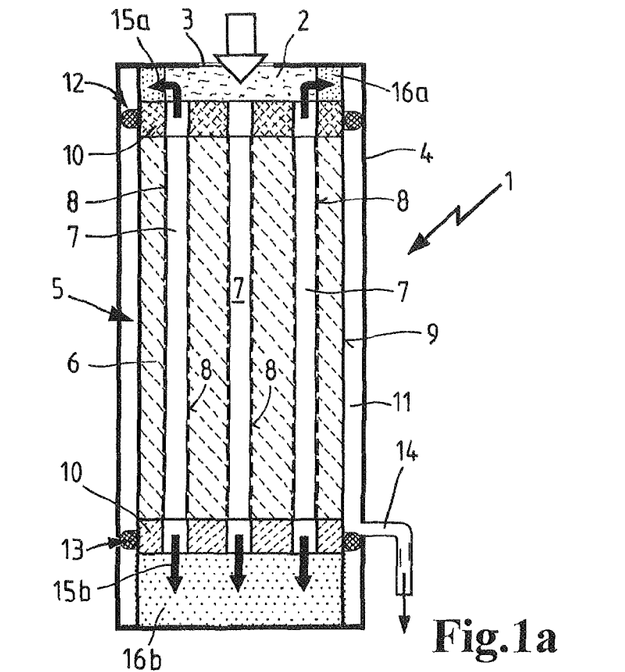
FIGS. 1a and 1b show exemplary embodiments of a filter device according to the invention with two ice compensation elements at the ends with and without a cooling device, respectively.

FIG. 1a shows a filter device 1 for cleaning liquids in a motor vehicle, in the present case for cleaning water separated from diesel in fuel filters. A liquid 2 to be filtered enters a housing 4 of the filter device 1, in which the filter element 5 is arranged, at an intake area (raw side) through an intake opening 3. The filter element 5 has a support body 6 that is comprised of a porous ceramic material, for example, aluminum oxide or silicon carbide, and that has a (circular) cylindrical geometry. In the support body 6 there are passages 7 for receiving the liquid 2 to be filtered. The walls of the passages 7 are coated with a thin filter membrane 8 for which the support body 6 acts as a support structure.

The liquid 2 to be cleaned is filtered by the filter membrane 8 in that only small molecules, in the present case water molecules, may pass the filter membrane 8 while larger molecules, in the present case mainly hydrocarbons contained in the fuel, are retained. The water molecules that have passed the membrane 8 form the filtrate and enter the porous support body 6, migrate therein in radial direction outwardly and exit at the circumferential or exterior wall surface 9 of the support body 6 from the support body 6. In order to prevent penetration of liquid 2 to be filtered at the end faces into the support body 6, both ends of the support body 6 are provided with a seal 10.

The clean side 11 of the filter device 1 is formed by an annular space that is extending between the circumferential surface 9 of the support body 6 and the inner wall of the housing 4 extending in the longitudinal direction. For sealing the annular space that forms the clean side 11, a first upper sealing element 12 and a second lower sealing element 13, each in the form of an O-ring, are mounted between the inner wall of the housing 4 and the circumferential wall 9 of the support body 6. The drain 14 is provided at the housing 4 at the lowest point, i.e., immediately above the lower sealing element 13 in order to ensure that the filtrate or filtered liquid (pure water) can drain completely from the housing 4. This is beneficial in particular when freezing of the filtrate occurs because in such an arrangement of the drain 14 a quicker exit of the water can be ensured and in this way ice-induced pressure of the expanding pure water in the annular space or the clean side 11 (also called permeate chamber) acting on the housing 4 or the support body 6 can be prevented.

The expansion of the freezing liquid 2 not only presents a problem at the clean side 11 but also at the raw side because the unfiltered water that is present in the passages 7 will expand and will create ice-induced pressure 15a,15b as indicated by the arrows at the upper and lower ends of the support body 6.

The ice-induced pressure 15a, 15b of the additional liquid volume being produced upon expansion of the liquid 2 is received in an annular upper as well as disk-shaped lower compensation element 16a, 16bm each comprised of an elastically compressible closed-pore plastic foam, for example, EPDM. The upper compensation element 16a that is arranged between the support body 6 and the housing 4 is compressed by means of the ice-induced pressure 15a in radial direction while the lower compensation element 16b that seals the passages 7 in the uncompressed state at the end face is compressed by the ice-induced pressure 15b in axial direction. By means of the compensation elements 16a, 16b it can be prevented that the ice-induced pressure acting on the filter membrane 8 or the support body 6 becomes so great that it may cause damage on the parts upon freezing of the liquid 2.

It is understood that in particular at the upper end of the support body 6 an ice compensation element can be optionally eliminated when the housing 4 is resting against the topside of the support body 6 or is integrally bonded thereto, by gluing or in another way. Optionally, the ice compensation elements can be completely eliminated when at the raw side a discharge device (not illustrated), for example, in form of a valve is arranged that is coupled with the engine control unit of the motor vehicle and is opened always when the engine is shut off. In this way, a defined emptying of the passages 7 can be realized so that the water that is stored in the support body 6 can penetrate into the passages 7 and no ice-induced pressure can be exerted within the passages 7 onto the ceramic structure of the support body 6.

Figure 1B:
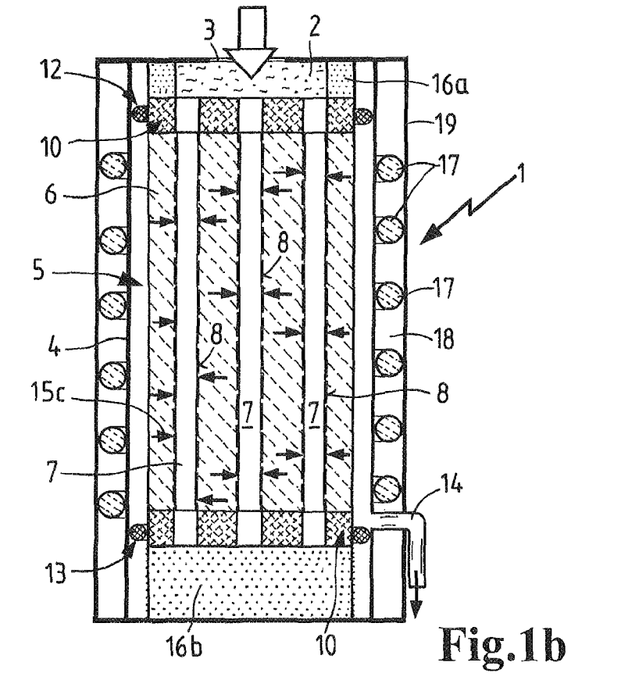

Once the problem of liquid expanding upon freezing has been resolved in the above described or in another way, freezing of the liquid 2 can also be used in a targeted fashion in order to provide a flow increase through the filter membrane 8. FIG. 1b shows a filter device 1 which for this purpose has a cooling device in the form of several Peltier elements 17 that are arranged in a further annular space 18 that surrounds the outer wall of the housing 4 and is delimited by insulation 19 provided at the exterior. By means of the freezing liquid 2 an ice-induced pressure 15c, indicated by the arrows, is generated on the filter membranes 8 by the water contained in the support body 6 of the filter membranes 8 so that a cover layer that has been formed on the filter membranes 8 during filtration of the substances contained in the liquid 2 to be filtered, for example, hydrocarbons, and that reduce the flow performance of the filter membrane 8 may be removed at least partially.

In particular when first using the filter device 1, care must be taken moreover that not the entire liquid 2 contained in the filter device 1 will freeze at the same time, i.e., that the freezing points in the intake area or the passages 7 and in the pores of the support body 6 filled with pure water will differ from one another. For each membrane filtration an increasing concentration of ions or molecules (also macromolecules, for example, separated hydrocarbons) results at the raw side. These substances cause comparatively quickly and already at minimal concentrations a freezing point depression within the passages 7. This has the result that first at a temperature of approximately 0 degrees C., the water within the pores of the support body 6 and subsequently, at temperatures significantly below 0 degrees C., the contaminated liquid 2 in the passages 7 with the membranes 8 will freeze. As a result of the different freezing points, the excess volume of the water that is produced upon freezing can expand in the support body 6 without impairment into the intake area or the passages 7.

Figure 2:
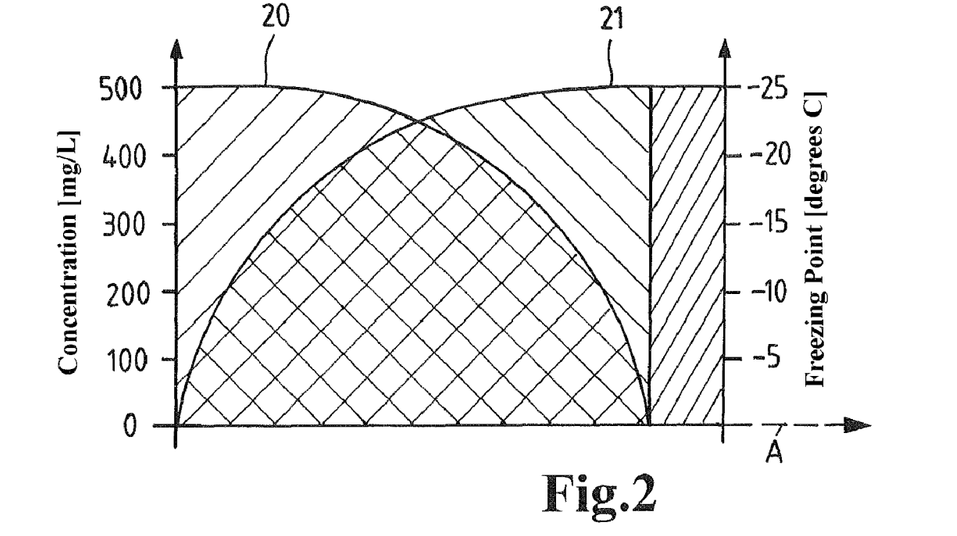
FIG. 2 shows the dependency of the freezing point of the liquid to be filtered based on the number of water discharge cycles when adding an antifreeze agent in a support body of the filter element.

Since upon first use of a new filter device 1 or a new filter membrane 8, the liquid 2 in the intake area, in particular in the passages 7, still has relatively low concentrations of dissolved substances, upon mounting of the filter element 5 an antifreeze agent can be introduced into the passages 7 of the support body 6. When selecting an antifreeze agent with a molecular size for which the filter membranes are impermeable, the antifreeze agent can remain within the passages 7 of the intake area. When selecting an antifreeze agent with a suitably selected molecular size, the molecules during the course of operation of the filter membrane 8 can successively pass through the membrane pores and can be transferred to the clean side 11, as indicated in FIG. 2, where to the left the concentration 20 of antifreeze agent is shown and to the right the concentration 21 of substances dissolved at the raw side and lowering the freezing point as a function of the number of water discharge cycles. In both cases, by use of an antifreeze agent when installing the support body a freezing point <0 degrees C. can be reached safely.

Figure 3A:
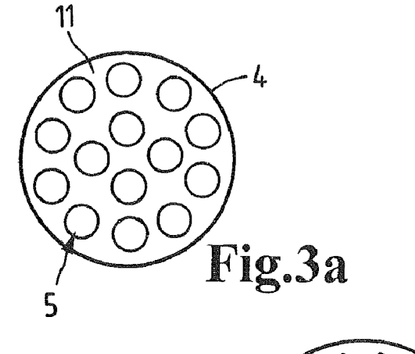
FIGS. 3a to 3c show three types of arrangements of filter elements in a housing, consistent with the present invention.

Alternatively to the filter device 1 shown in FIGS. 1a, 1b which has a filter element 5 with only one support body 6 that almost completely fills the housing 4, it is also possible to arrange two or several filter elements in the housing 4; this will be explained in the following with the aid of FIGS. 3a-3c. Advantageously, in this connection the outer geometries for the support bodies 6 are selected such that a uniform distribution of wall thickness and a volume proportion as minimal as possible of the ceramic structure in the housing 4 or the permeate chamber 11 is produced so that an unhindered exit from each passage as much as possible is achieved. For this purpose, several smaller filter element units are particularly suitable because the water in this case upon freezing can exit simultaneously at all circumferential surfaces and no unnecessary or impairing intermediate surfaces are present. For example, several cylinder-shaped filter elements 5 with circular base surface can be provided that have inner geometries corresponding to those of FIGS. 1a, 1b and are spaced from one another in a common housing 4, as illustrated in FIG. 3a. It is understood that the inner geometry of the filter elements 5 can also be embodied as, for example, described in the aforementioned publications CA 2192107, CA 2192109, or DE 197 31 551 A1.

Figure 3B:
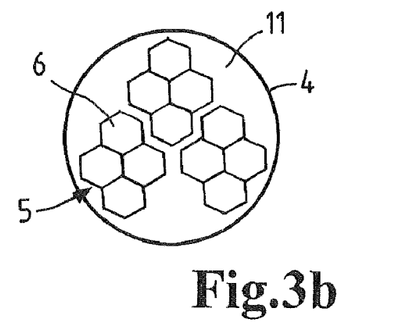
Figure 3C:
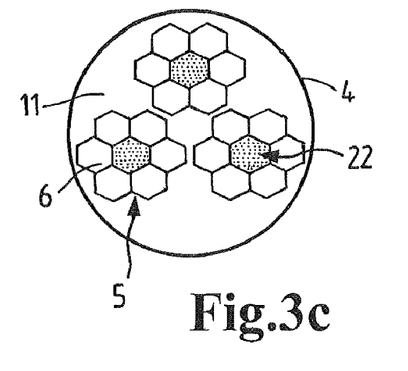

FIGS. 3b, 3c show three spaced apart filter elements 5 each having several honeycomb-shaped cylindrical support bodies 6 with hexagonal base surface that are connected to one another with three of their six circumferential surfaces. In the example illustrated in FIG. 3b, four support bodies 6 each form a filter element 5 wherein three circumferential surfaces of the support bodies 6 face the permeate chamber 11. In FIG. 3c the filter element 5 has six outer support bodies 6 that are arranged about an inner support element 22 that has no circumferential surface communicating with the permeate chamber 11 and therefore does not contribute to filtration.

In the following, with the aid of FIGS. 4a, 4b and FIGS. 5a, 5b based on a filter device 1 with a single filter element 5, constructed as shown in FIGS. 1a, 1b, two different kinds of attachment of a lower cap-shaped ice compensation element 16b will be described that is formed monolithically and has an elastomer membrane 23 for sealing the passages 7 at the lower end face of the support body 6. The membrane 23 passes from its outer edge into an area surrounding the circumferential side 9 of the support body 6 that ends as an O-ring 13.

Figure 4A:
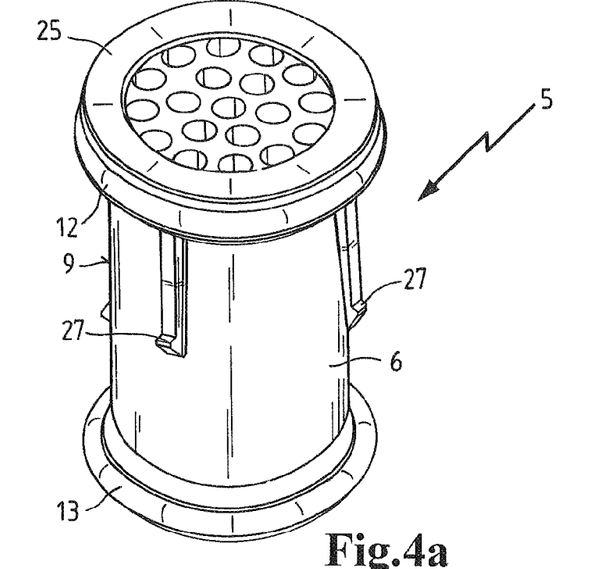
FIGS. 4a, 4b show a perspective view and a sectional illustration of an exemplary embodiment of the filter device with an elastic membrane as an ice compensation element and a sealing cap, consistent with the present invention.
Figure 4B:
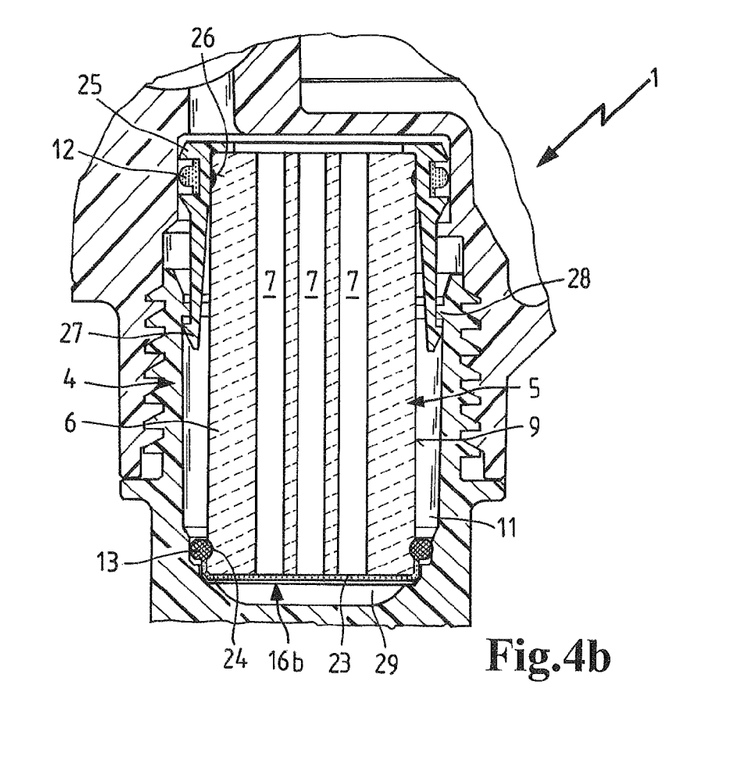

In FIGS. 4a, 4b a variant of the attachment of the compensation element 16b is illustrated in which the O-ring 13 engages an annular groove 24 at the circumferential surface 9 of the support body 6. The elastic O-ring 13 serves in this connection for securing the compensation element 16b on the support body 6 as well as for sealing the annular chamber 11 (clean side) relative to the housing 4 of the filter element 5 as shown in FIG. 4b. For fixation of the filter element 5 on the housing 4 as well as for sealing the annular chamber 11 in the upward direction, an upper sealing cap 25 is provided that is secured on the filter element 5 or the support body 6 by an O-ring 12 that engages with its inner side portion an annular groove 26 provided at the upper end of the circumferential surface 9 of the support body 6. The upper sealing cap 25 has four locking elements 27 in the form of locking noses that lock on a projection 28 provided on the housing 4. Upon freezing of the liquid 2 in the passages 7 with the filter element 5 secured or locked in the housing 4 the membrane 23 will expand into a recess 29 provided underneath and having a concavely curved surface to be contacted by the membrane 23 in the deformed state.

Figure 5A:
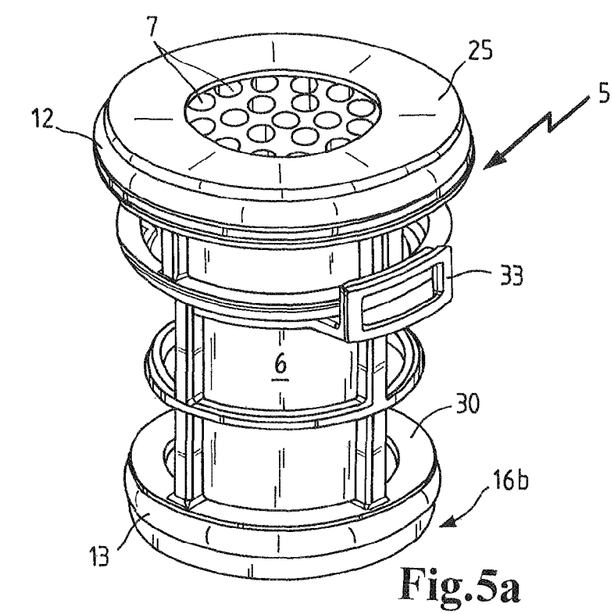
FIGS. 5a, 5b show a perspective view and a sectional illustration of a further embodiment of the filter device with two sealing caps, consistent with the present invention.
Figure 5B:
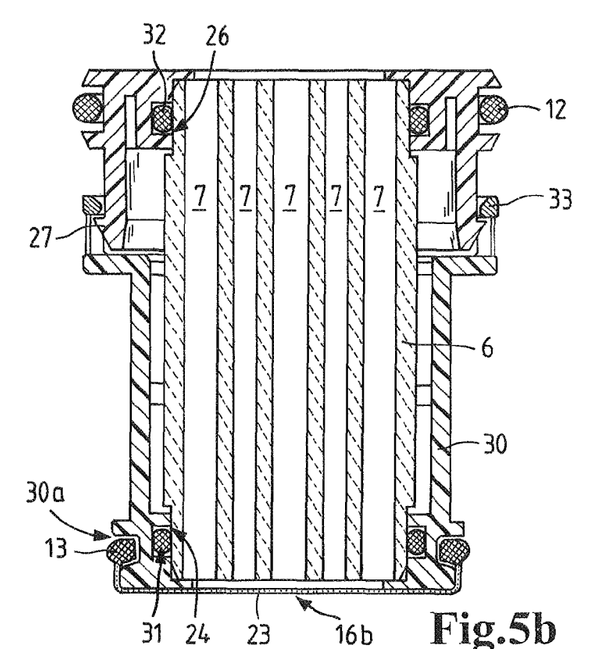

The filter element 5 that is shown in FIGS. 5a, 5b differs from that illustrated in FIGS. 4a, 4b substantially in that in addition to the upper sealing cap 25 a lower sealing cap 30 is provided that is secured by means of O-ring 31 on the lower annular groove 24 on the support body 6. In accordance with this the upper sealing cap 25 is secured by means of a further O-ring 32 that engages the upper annular groove 26 at the support body 6. The upper sealing cap 25 engages with locking noses 27 a web-shaped locking element 33 of the lower sealing cap 30 in order to secure the two sealing caps 25, 30 in their respective positions to one another. The O-ring 13 of the compensation element 16b engages an annular groove 30a of the lower sealing cap 30a and serves, as in FIGS. 4a, 4b, for sealing the filter element 5 against housing (not illustrated). In accordance with this, an upper O-ring 12 provided on the upper sealing cap 25 serves for sealing the filter element 5 relative to a housing (not illustrated). It is understood that the upper and lower sealing caps 25, 30 may also be attached in other ways to the support body 6, for example, in that they are glued to the support body 6, for example, by an epoxy-based adhesive.

Figure 6A:
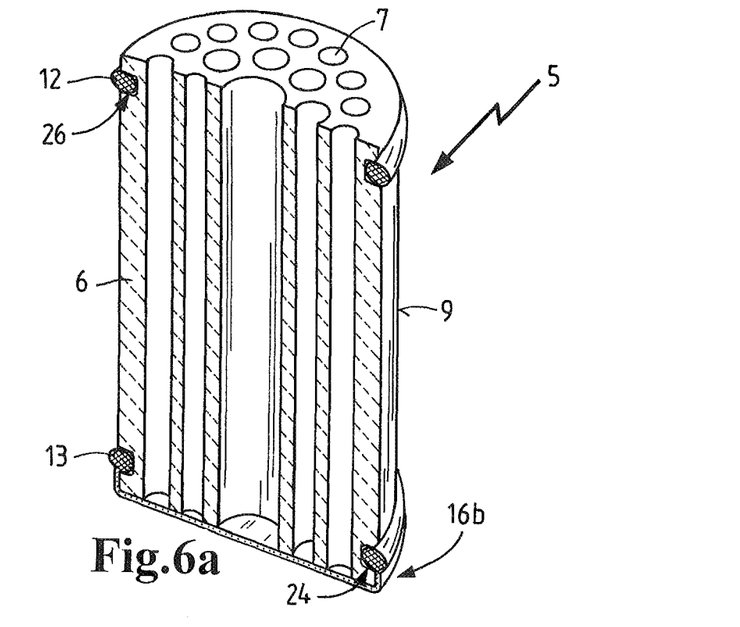
FIGS. 6a, 6b show two section illustrations of a filter element without sealing caps, consistent with the present invention.
Figure 6B:
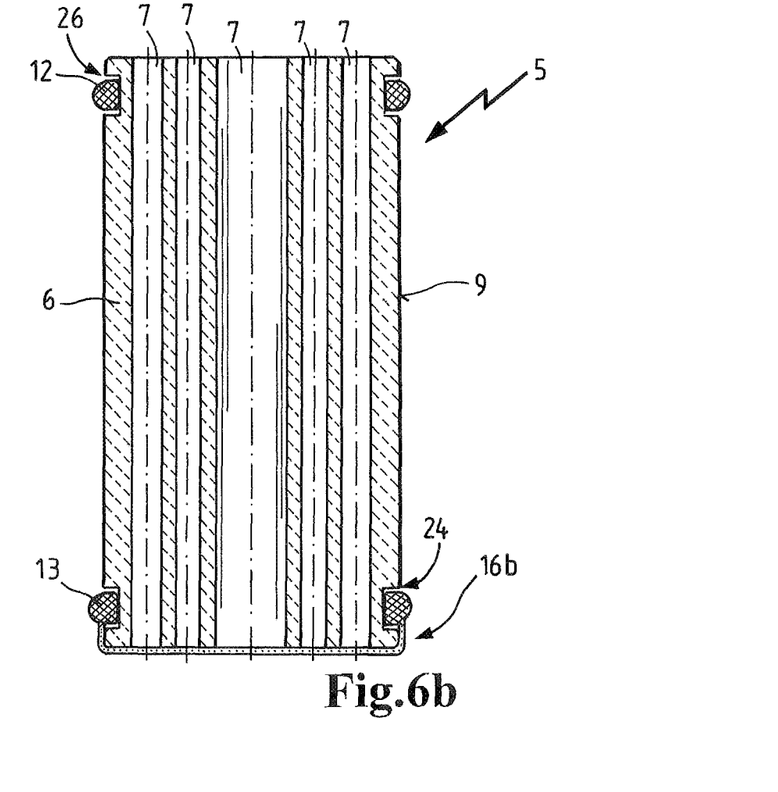

FIGS. 6a, 6b show a further embodiment of the filter element 5 in which, as shown in FIGS. 4a, 4b the lower cap-shaped compensation element 16b with its O-ring 13 engages an annular groove 24 at the lower end of the circumferential surface 9 of the support body 6. For sealing the filter element 5 in the upward direction an O-ring 12 engages an annular groove 26 that is formed at the upper end of the circumferential surface 9 of the support body 6. The cap-shaped compensation element 16b as well as the O-ring 12 serve for sealing the filter element 5 relative to a housing (not illustrated) so that in this embodiment sealing caps (rigid ones) are completely dispensed with. It is understood that instead of a commercial O-ring 12 also a shaped seal can be used that partially engages across the edge at the end of the support body 6 and therefore also provides edge protection for the support body 6.

Figure 7A:
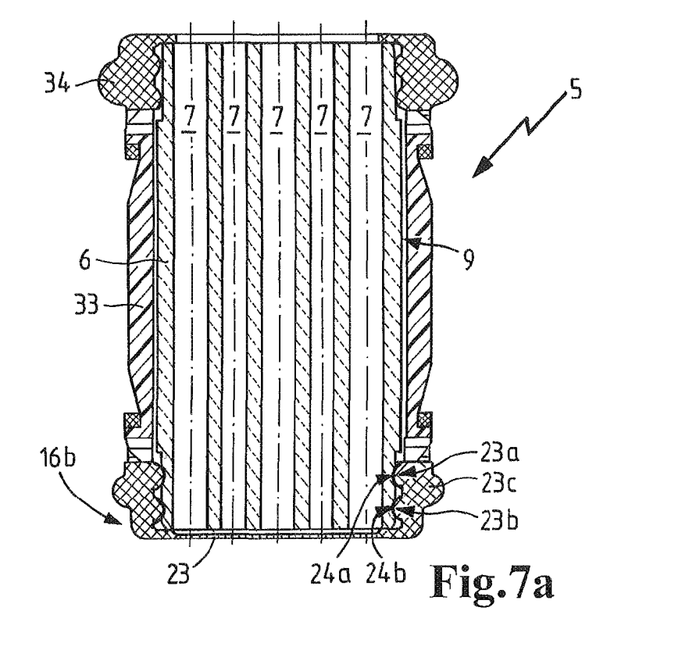
FIGS. 7a, 7b show a section illustration as well as a perspective illustration of a further filter element with an elastomer membrane and a cap-shaped sealing element that are secured on a locking element surrounding the support body circumferentially.
Figure 7B:
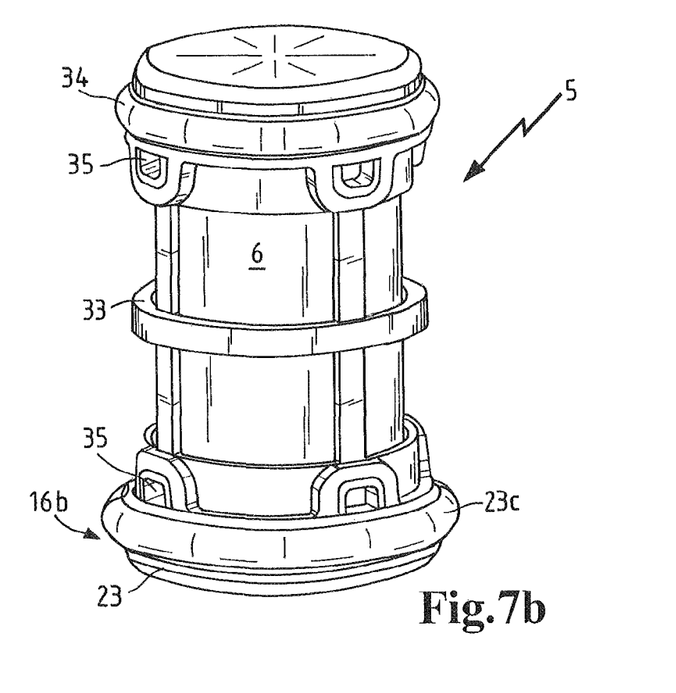

An embodiment of the filter element 5 in which the lower cap-shaped compensation element 16b is also formed by an elastomer membrane 23 is shown in FIGS. 7a, 7b. The membrane 23 has at its inner side in an area that surrounds the circumferential side 9 of the support body 6 two annular beads 23a, 23b that engage corresponding annular grooves 24a, 24b of the circumferential side 9 of the support body 6. For sealing the support body 6 against a housing (not illustrated) on the exterior side of the elastomer membrane 23 a further bead-shaped projection 23c is formed. At the upper end of the support body 6, a cap-shaped sealing element 34 (shaped seal) that is formed in the same way as the membrane 23 is provided which in contrast to the membrane 23 engages only the rim area of the upper end of the support body 6. The upper cap-shaped sealing element 34 and the elastomer membrane 23 have engagement openings 35 for locking noses that are formed on two opposite ends of a locking element 33 which surrounds the circumferential surface 9 of the support body 6. In this way, a fixation of the membrane 23 and of the sealing element 34 can be achieved without requiring sealing caps of a rigid material.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A filter device for a motor vehicle, the filter device comprising:
   a filter element including
   a porous ceramic support body provided with one or more liquid passages receiving a liquid to be filtered,
   said liquid subject to freezing, said liquid expanding in volume within said filter element passages upon freezing; and
   filter membranes formed on inner walls of said one or more passages,
   wherein the liquid to be filtered passes through said filter membranes into said support body and exits from said support body through a circumferential surface of said support body; and
   at least one compensation element is arranged at an end face of said support body,
   wherein said one or more liquid passages open through said end face of said support body,
   wherein said at least one compensation element is an elastically deformable membrane,
   wherein said at least one compensation element closes over and seals off ends of said one or more liquid passages,
   wherein said at least one compensation element is adapted to elastically deform in response to expanding liquid volume in said one or more liquid passages generated when the liquid expands due to freezing.

2. The filter device according to claim 1, comprising
   a housing in which said filter element is arranged,
   wherein said housing has a recess provided therein adapted to receive said elastically deformable membrane in said deformed state.

3. The filter device according to claim 1, wherein
   said at least one compensation element is cap-shaped;
   wherein said compensation element comprises a securing element securing said at least one compensation element onto said circumferential surface of said support body.

4. The filter device according to claim 3, wherein
   said securing element is a sealing element adapted to seal said circumferential surface of said support body relative to a housing in which said filter element is arranged.

5. The filter device according to claim 4, wherein
   said sealing element is an O-ring.

6. The filter device according to claim 1, further comprising
a sealing cap arranged at said end face of said support body,
wherein said at least one compensation element is cap-shaped and comprises a securing element configured to secure said at least one compensation element onto a circumferential surface of said sealing cap.

7. The filter device according to claim 6, wherein
said at least one sealing cap comprises a locking element configured to lock said at least one sealing cap onto a housing in which said filter element is received.

8. A filter device for a motor vehicle, the filter device further comprising:
a filter element including
a porous ceramic support body provided with one or more passages for receiving a liquid to be filtered; and
filter membranes formed on inner walls of said one or more passages,
wherein the liquid to be filtered passes through said filter membranes into said support body and exits from said support body through a circumferential surface of said support body; and
at least one compensation element is arranged at an end face of said support body,
wherein said at least one compensation element is adapted to elastically deform in response to additional liquid volume generated when the liquid expands due to freezing,
a first and a second sealing cap surrounding opposing ends of said filter element,
wherein at least said first sealing cap comprises a locking element that locks said first sealing cap onto said second sealing cap.

9. The filter device according to claim 1, wherein
a plurality of said filter elements are arranged spaced apart from one another in a common housing;
wherein said support bodies of said two or more filter elements have a circular cross-sectional shape or a honeycomb cross-sectional shape.

10. The filter device according to claim 1, wherein
said support body is formed of a material having a sufficiently high strength or high hardness to resist ice pressures during liquid freezing.

11. The filter device according to claim 1, wherein
an antifreeze agent is provided in said passages of said filter element.

12. The filter device according to claim 1, comprising
a housing in which said filter element is arranged,
wherein said housing includes a drain for a filtrate of the liquid,
wherein said drain is arranged immediately above a sealing element sealing a clean side of said filter element in which said clean side is formed between said circumferential surface of said support body and said housing.

13. The filter device according to claim 1, further comprising
a discharge device for discharging the liquid to be filtered from said passages.

14. The filter device according to claim 13, wherein
said discharge device is a valve.

15. The filter device according to claim 1, further comprising
a cooling device operable to freeze said filter membranes.

16. The filter device according to claim 15, wherein
said cooling device comprises a Peltier element.

\* \* \* \* \*